United States Patent [19]
Colson et al.

[11] Patent Number: 5,603,368
[45] Date of Patent: *Feb. 18, 1997

[54] ROLL UP ROMAN SHADE

[75] Inventors: Wendell B. Colson, Boulder; Raymond N. Auger, Aspen, both of Colo.

[73] Assignee: Hunter Douglas Inc., Upper Saddle River, N.J.

[*] Notice: The term of this patent shall not extend beyond the expiration date of Pat. No. 5,425,408.

[21] Appl. No.: 475,593

[22] Filed: Jun. 7, 1995

Related U.S. Application Data

[63] Continuation-in-part of Ser. No. 320,116, Oct. 7, 1994, Pat. No. 5,425,408, which is a continuation of Ser. No. 85,677, Jun. 30, 1993, abandoned, which is a continuation of Ser. No. 825,591, Jan. 24, 1992, abandoned, which is a division of Ser. No. 520,932, May 9, 1990, Pat. No. 5,104,469.

[51] Int. Cl.$^6$ ............................................. E06B 9/24
[52] U.S. Cl. ...................... 160/84.05; 156/197; 428/116; 160/121.1; 160/238
[58] Field of Search ............................ 160/84.01–84.11, 160/238, 87, 121.1; 156/197; 428/116, 118, 188

[56] References Cited

U.S. PATENT DOCUMENTS

| | | | |
|---|---|---|---|
| 4,677,013 | 6/1987 | Anderson | 160/84.05 X |
| 5,246,052 | 9/1993 | Homan | 160/67 X |
| 5,425,408 | 6/1995 | Colson . | |
| 5,503,210 | 4/1996 | Colson et al. | 160/84.05 |

*Primary Examiner*—Blair Johnson
*Attorney, Agent, or Firm*—Gary M. Polumbus

[57] ABSTRACT

An improved expandable and contractible window covering comprising a series of elongated cells is disclosed. Each cell is formed by joining a pleated sheet of material with an unpleated sheet in an area of creases on the pleated sheet. The rear wall of the cell is of less height than the front wall of the cell and the material of the cell is chosen to be relatively soft and flexible so that the front wall of each cell droops downwardly and outwardly away from the rear wall. The covering is mountable on a roll bar so as to be retracted by rolling about the roll bar and extended by unrolling from the roll bar.

5 Claims, 7 Drawing Sheets

ROLL UP ROMAN SHADE

CROSS REFERENCE TO RELATED APPLICATIONS

This application is a continuation-in-part of U.S. application Ser. No. 08/320,116 filed Oct. 7, 1994, U.S. Pat. No. 5,425,408, which is a continuation of U.S. Ser. No. 08/085,677 filed Jun. 30, 1993, abandoned, which is a continuation of U.S. Ser. No. 07/825,591 filed Jan. 24, 1992, now abandoned, which is a division of U.S. Ser. No. 07/520,932 filed May 9, 1990 which is now U.S. Pat. No. 5,104,469.

BACKGROUND OF THE INVENTION

1. Field of the Invention

This invention relates to an improved window covering. More particularly, this invention relates to an improved window covering of the Roman shade type wherein one side of the shade, typically arranged so that this side is toward the interior of a room, consists of a number of horizontally parallel curved surfaces, and in which each of these curved surfaces forms the front wall of a tubular cell extending horizontally across the width of the shade, thus creating a thermal insulating window covering with an extremely attractive appearance.

2. Description of the Prior Art

Several publications show cellular shades, wherein a fabric material is formed to define parallel tubular cells extending horizontally across the width of the shade. Air within each of the cells only circulates minimally, such that when expanded the shades provide good thermal insulation.

It is, of course, desirable to make the physical appearance of the shade as attractive as possible. Similarly, it is desirable to make such shades as economically as possible, which requires both that a minimal amount of material be used to form each cell and that the manufacturing process be as expeditious as possible.

Various exemplary prior art disclosures include the following:

U.S. Pat. No. 2,201,356 to Terrel discloses a window shade made by joining two folded sheets having interior and exterior folds. FIGS. 4 and 5 show an asymmetrical embodiment where the interior folds of one sheet are joined to the exterior folds of the other sheet.

U.S. Pat. No. 3,892,898 to Yasui relates to a honeycomb panel core having interlocking expandable and contractible W-shaped and V-shaped components disposed between partition plates.

U.S. Pat. No. 4,347,887 to Brown shows a "thermal shutter." A wide band of material is folded transversely to form a double row column of adjacent cells, which may have rounded visible contours. The cells are adhesively bonded to one another. The Brown structure is symmetrical, so that both sides of the shade thus formed have essentially the same appearance.

U.S. Pat. Nos. 4,631,217, 4,676,855 and 4,677,013 to Anderson show in FIG. 3 a shade of asymmetrical construction. A rear wall section of each cell is essentially straight or linear when the shade is in its expanded position. The width of these rear wall sections thus defines the spacing of the adjacent cells, while the front of each cell, containing more material, maintains a non-linear shape.

U.S. Pat. No. 4,685,986 to Anderson shows a cellular shade formed by joining two pleated lengths of material along opposing pleats. FIG. 6 shows an asymmetrical embodiment of the invention, in which the rear wall is essentially straight when the shade is in its expanded position.

U.S. Pat. No. 4,846,243 to Schneider shows a foldable window covering formed of a wide relatively soft material folded transversely, as in the Brown patent, to yield a collapsible shade. The front surface of the shade consists of a material doubled back on itself. The successive cells are spaced in the expanded position of the shade by a relatively vertical rear wall section of each cell.

U.S. Pat. No. 4,861,404 to Neff, owned by the assignee of the present application, shows a method of making a honeycomb product from two sheets of pleated material. Alternating pleats are formed of large and small dimensions, and end parts of the large pleats are then bonded together to form leg portions. These leg portions are then joined to opposing pleats of another sheet.

U.S. Pat. No. 5,097,884 to Sevcik et al. shows a Roman shade type window covering, made by joining successive folded strips of material using a manufacturing process as exemplified by U.S. Pat. No. 4,450,027 to Colson. The product in that application has substantially the same appearance as that of the present invention, but its structure and the process of manufacture are different.

SUMMARY OF THE INVENTION

It is an object of the invention to provide an improved Roman shade consisting of a series of parallelly arranged generally tubular cells, each having a front wall which consists of a loop formed of a soft material which is essentially uncreased in the finished product, such that the loop droops somewhat, providing an aesthetically pleasing appearance, while the rear wall of each cell is essentially linear or of other configuration so that when the shade is in the expanded state, the height of the rear wall determines the spacing of adjacent cells and holds the loop of the front wall from being pulled out.

It is a further object of the invention to provide a shade which can be manufactured using essentially methods and apparatus as shown, for example, in the Anderson U.S. Pat. No. 4,685,986.

These and other objects of the invention which will appear to those skilled in the art are met by the present invention, which comprises an improved Roman shade consisting of a series of parallel cells formed by joining two lengths of material at opposing, inwardly-directed pleats. Each cell includes a rear wall portion, which determines the spacing of the cells when the shade is in its expanded state, a top portion, a front wall portion defining a generally drooping curved surface extending in a curve from the top portion of the cell downwardly and away from the rear wall portion, and a bottom portion extending from the front portion to the rear wall and defining, at least in part, the top of the next underlying cell. The cell front surface provides an extremely attractive appearance. The shade may be manufactured generally using the techniques and apparatus shown in the Anderson U.S. Pat. No. 4,685,986. The shade can be mounted on a headrail with pull-up cords such that each cell collapses upon itself as a lower rail connected to the bottom of the shade is raised or, in an alternative embodiment, the shade can be mounted on a roll bar for retraction therearound.

DESCRIPTION OF THE INVENTION

Figures 1, 2:
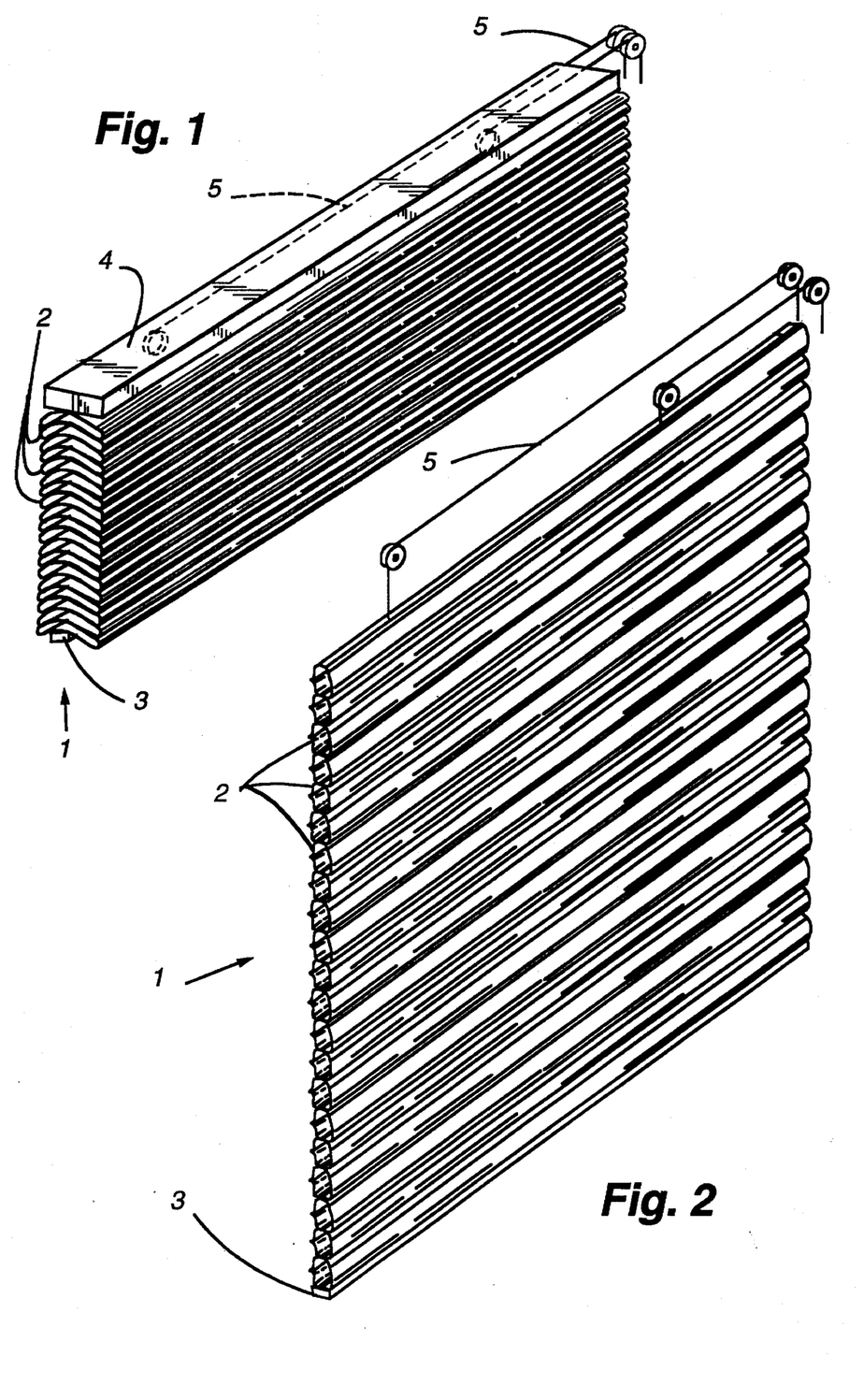
FIG. 1 shows a first embodiment of the shade of the invention in its nearly collapsed state.
FIG. 2 shows the shade of FIG. 1 in its expanded state.

As indicated above, FIGS. 1 and 2 show the shade of the invention in its collapsed and expanded states. As can be seen, the shade comprises a series 1 of parallelly arranged cells 2 extending horizontally. The series of cells 2 is fitted with a bottom rail 3 and a headrail 4 (omitted from FIG. 2 for clarity). The series is adapted to be fitted into a window opening, for example, with the longitudinal cell axis transverse to the direction of expansion and contraction of the assembly. The motion of the shade between the collapsed state of FIG. 1 and the expanded state of FIG. 2 is controlled by control cords 5 extending from the bottom rail 3 upwardly across the cells 2, and into the headrail 4. The cords are directed by generally conventional control pulleys, guides and the like, and are engaged by a conventional locking dog engaging mechanism (not shown).

As indicated in FIGS. 3–7, the cells 2 are formed by two sheets of flexible fabric material, each having a set of transverse creases defining pleats, and the sheets are joined to one another in the area of confronting, inwardly-directed creases 20, 22 (i.e., the creases which point toward the center of the shade when complete). A first sheet commonly defines back faces of the cells, and a second sheet commonly defines front faces of the cells, the faces being those portions which are visible when the shade is in use. Preferably, the sheet which makes up the back of the shade has a second set of outwardly-directed creases 21 to aid in the manufacture and operation of the shade. Each cell 2 has a cross-sectional shape including a drooping front wall 11 extending downwardly from the top portion of each cell and projecting outwardly and away from its back face, so that each cell is wider toward its bottom. Preferably, the material of the front wall 11 of each of the cells is of sufficiently greater height compared to the rear wall 8 that the front bottom portion of each cell droops downwardly at least as far as the juncture between the cell and the directly adjacent lower cell when the shade is in the expanded state. Accordingly, when the shade is in its collapsed state as shown in FIG. 1, the drooping loop formed by each cell extends well below the juncture with the adjacent lower cell.

Figure 3:
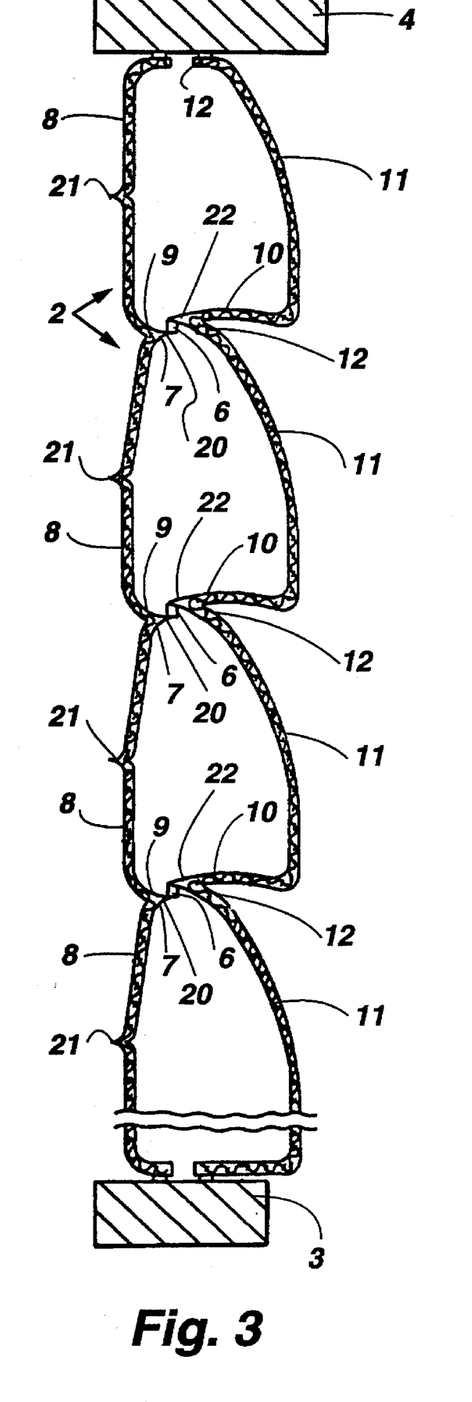
FIG. 3 shows a cross-sectional view of the embodiment of FIG. 1 in the expanded state showing the individual cell structure of the shade.
Figure 4:
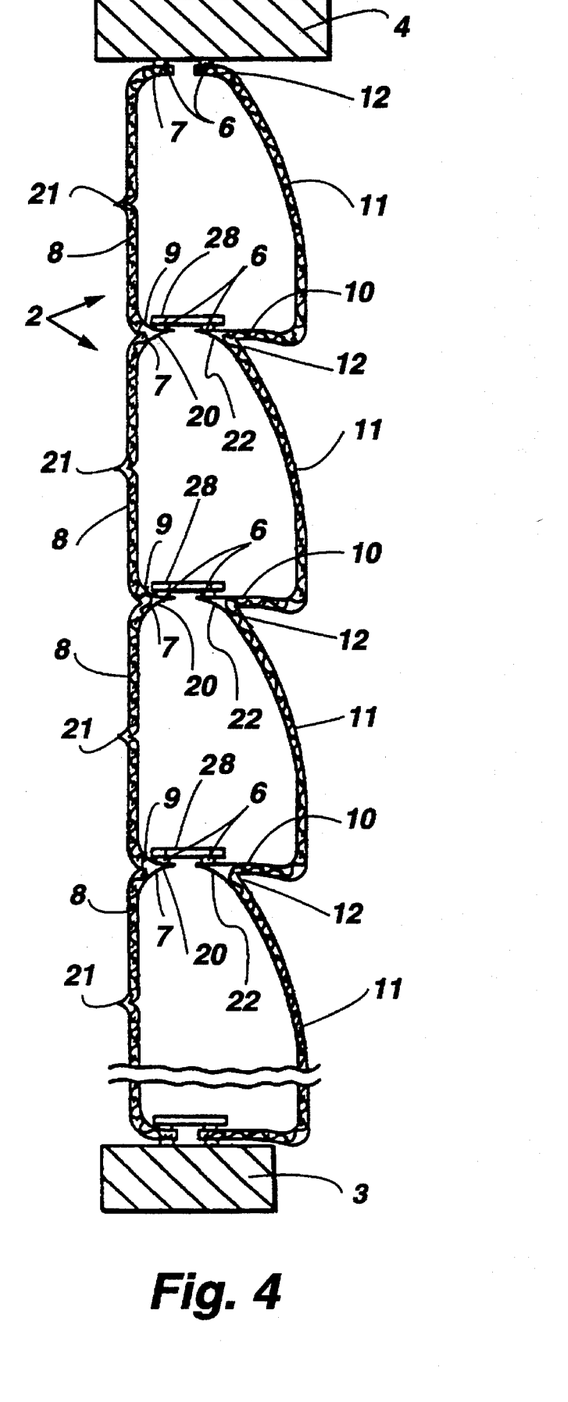
FIG. 4 shows a cross-sectional view of a second embodiment of the shade of the invention in the expanded state showing the individual cell structure of the shade.
Figure 5:
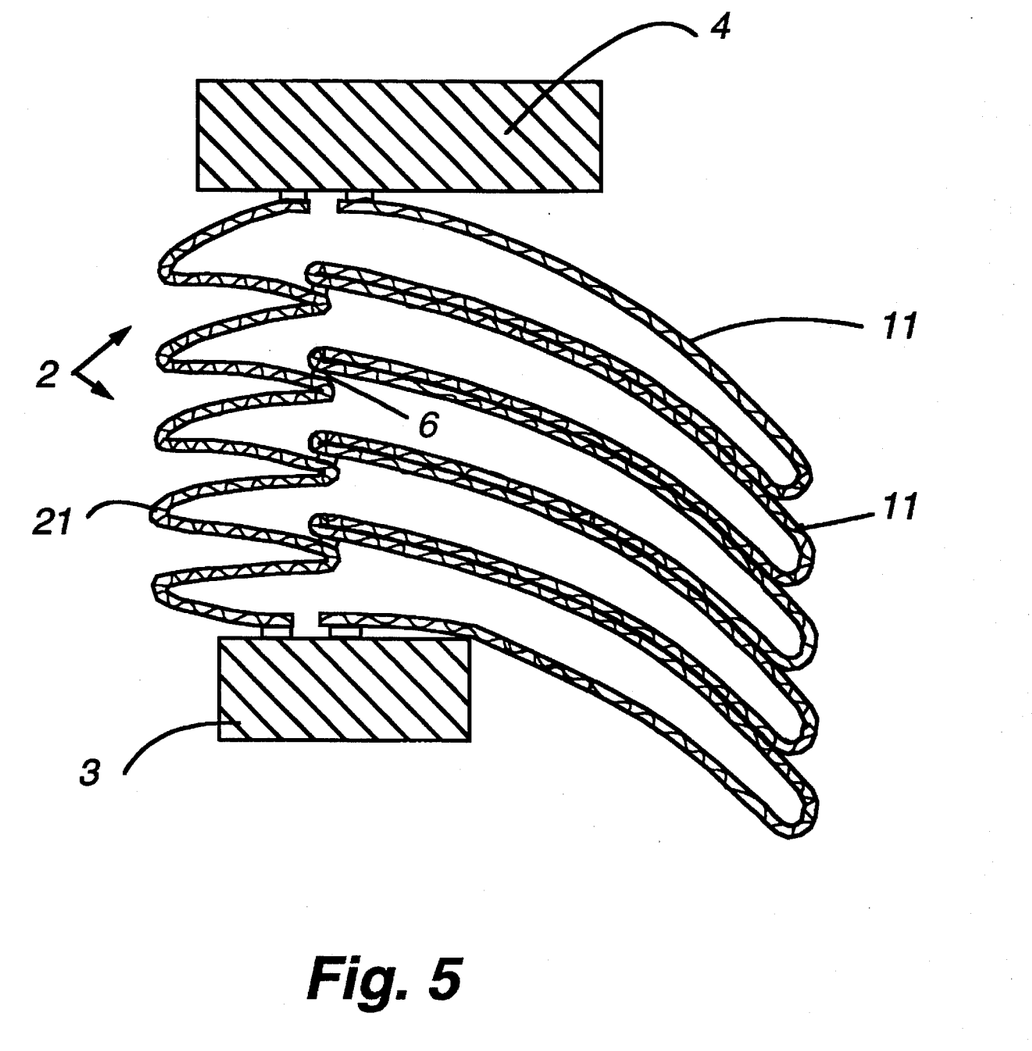
FIG. 5 shows a cross-sectional view of the embodiment of FIG. 1 in the nearly collapsed state.

As can be seen from FIG. 3 and 4, the cells 2 making up the series 1 are formed by fixedly joining two pleated sheets of material in the area of their confronting, inwardly-directed creases. In this way, the pleated sheets are formed into a series of tubular cells with open ends. As typically used, these shades are disposed between opposed surfaces of the casing of a window. The width of the shade is preferably chosen so that the ends of the cells approach the casing closely, such that little air flow takes place through the cells. In this way, the air mass in each cell is essentially static, whereby the cells of air form very effective thermal insulation.

According to the embodiment of the invention shown in FIG. 3, the pleated sheets of material are joined by beads 6 of adhesive at confronting creases 20, 22 which partially overlap each other. One of these sheets 18 defines a rear wall portion 8 extending downwardly from a top rear portion 7, and a bottom rear portion 9 extending forwardly from the rear wall portion. A second sheet of pleated material 19 defines a front wall portion 11 extending downwardly from a top front portion 12, and a bottom front portion 10 extending rearwardly from the front wall. The top front portion 12 of one cell is bonded by the bead 6 of adhesive to the bottom rear portion 9 of the adjacent upper cell. Alternatively, the top rear portion 7 of one cell could be bonded to the bottom front portion 10 of the adjacent upper cell. The formed cells in cross-section effectively define continuous closed loops of material.

According to the preferred embodiment of the invention, it is desirable that the cell by asymmetrical such that the rear wall portion 8 is of substantially less height (as measured in the vertical direction of the final window covering, transverse to the longitudinal axis of the cell) than the front wall portion 11. Thus, the rear wall portion would determine the amount of cell expansion which is possible. In this way, each cell can be arranged to be of predetermined height from the top to the bottom of the shade, for effecting the desired appearance.

The extent of cell expansion of the assembly is thus controlled by the height of the rear wall portion 8 of each cell; this, together with the amount of material in the front wall portion, determines the curvature of the generally curved surface of the front wall portion 11 of the cell.

It is also preferred that the entire sheet be formed of a relatively soft and flexible fabric material so that in the expanded position shown in FIG. 3, the front wall portion 11 droops downwardly and outwardly away from the rear wall 8, forming a smoothly rounded curve. Typically, the lowest part of the front wall portion is level or beneath the juncture of the cell with the directly adjacent lower cell. This provides an extremely attractive appearance. It is further preferred that the front wall portion not be creased perceptibly when the shade is in use, principally for aesthetic reasons.

It is not necessary that both sheets be pleated. One sheet may be provided with a first set of pleats, which are joined at intervals along the length of a second, unpleated material. Among the alternative embodiments of the invention, a minimum of one set of pleats on one sheet is therefore required.

A temporary crease to assist in manufacture of the shade of the invention can be provided in a number of ways. For example, in order to form a permanent crease in a polyester film material, it is necessary to heat the material to a given temperature while folding it and to press it against a hard surface to form a sharply set crease. However, a temporary crease can be formed during the manufacturing process by pressure with a limited amount of heating. If the shade is then hung and allowed to expand, and the crease is heated above a transition temperature, the polyester material will tend to return to its original shape, so that the temporary crease will effectively disappear.

Similarly, a cotton fabric with a water soluble sizing such as starch can be used to form the shade of the invention. Such a sized cotton fabric can be creased as if it were paper. However, the starch can be dissolved if the shade is subsequently hung out and wetted, removing the creases. Similar techniques may be useful with polyester and synthetic materials.

It is possible to form the shade of the invention from materials which do not crease, such as elastomeric materials.

Figure 6:
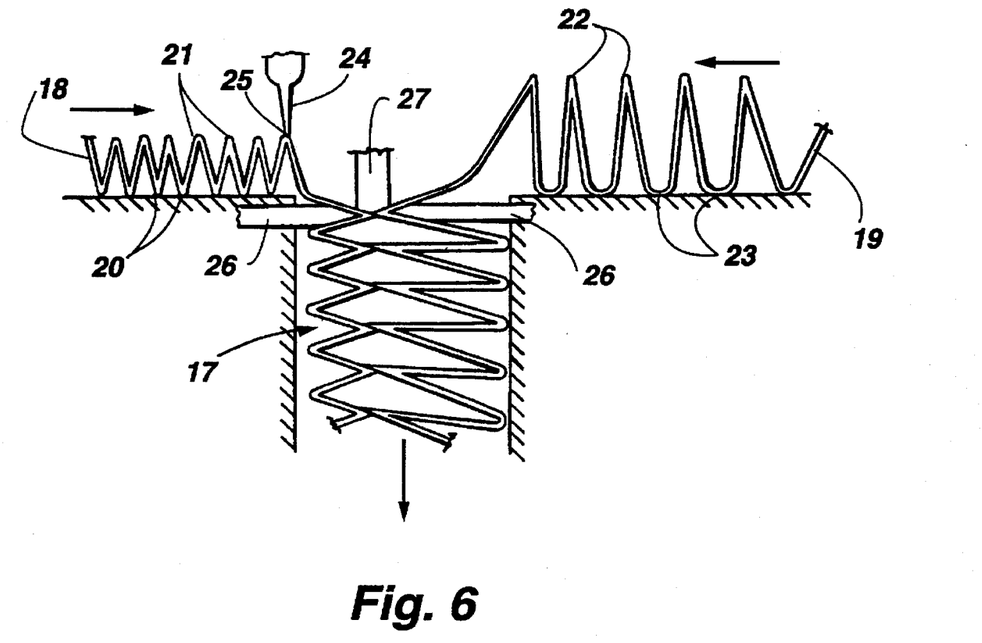
FIG. 6 is a schematic view showing the manufacturing process employed in producing the cellular structure of FIG. 3.

The basic method of forming the series of cells of the embodiment of FIG. 3 includes an initial step of folding the sheets of material into a pleated form as shown in FIG. 6. The basic method is fully disclosed, most particularly at column 4, line 15 through column 6, line 50, in the Anderson U.S. Pat. No. 4,685,986, which patent is incorporated herein by reference.

Figure 7:
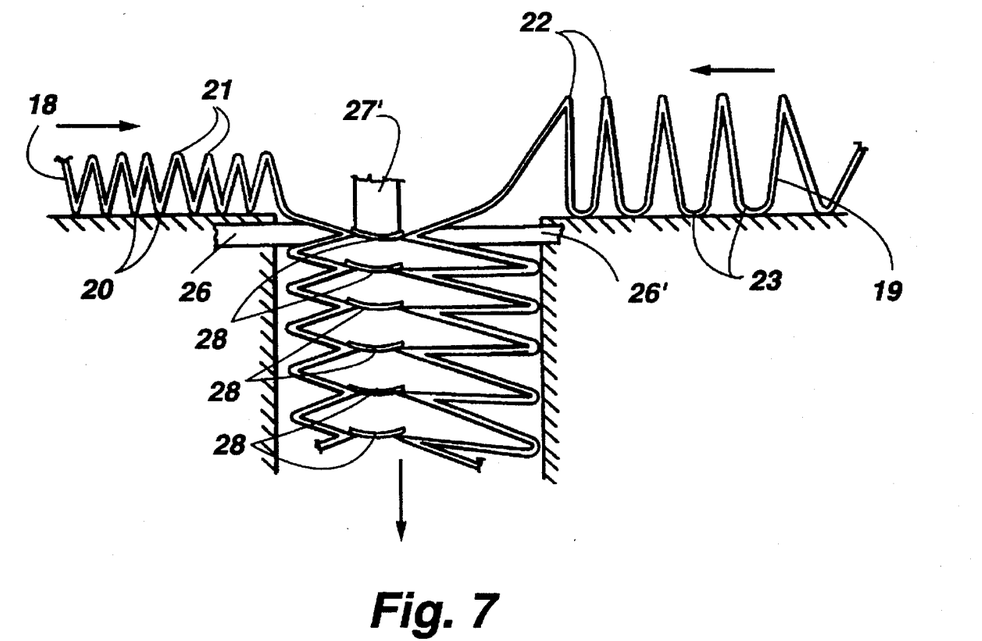
FIG. 7 is a schematic view showing the manufacturing process employed in producing the cellular structure of FIG. 4.

The basic method of forming the series of cells of the embodiment of FIG. 4 as shown in FIG. 7 is similar to that of FIG. 6 but employs separate strip material 28 between opposing, inwardly-directed creases 20, 22 to join the two sheets. This method is also disclosed in U.S. Pat. No. 4,685,986 to Anderson.

As indicated above, it is an object of the preferred embodiment of the invention to provide a shade having cells each with the appearance of a smooth and uncreased curved front wall portion 11, and in which permanent creases are avoided during assembly. In the Anderson process shown in U.S. Pat. No. 4,685,986, an expandable-collapsible honeycomb structure is provided from two pleated lengths of material; one of these materials will form one side of the honeycomb structure, while the other will form the other side. Thus, they can be made of the same or different material. Also, the creases in the material can be formed as part of the honeycomb forming process or can be preformed. In any event, the pleated materials are joined together along their creased areas. Permanently creasing the front wall portions ill the same manner as in the Anderson process is avoided, to provide smooth front wall portions for the sake of appearance.

FIGS. 6 and 7 of the present application partially show the apparatus of the '986 patent, as used in accordance with the teachings of the present invention. In both figures, the two sheets of material are attached in the area of confronting, inwardly-directed creases.

As shown in FIG. 6, the honeycomb structure 17 is formed by continuously feeding a continuous length of each of the materials 18 and 19 longitudinally of their length and in directions extending toward each other. The first material 18 has a first set of transverse creases 20. The first material also has a second set of transverse creases 21 spaced along the length of the material in alternating fashion with and opposite to the first set of creases 20. The second piece of material 19 has only a first set of transverse creases 22. The first sets of creases on both materials permit the materials to collapse in the accordion fashion shown in FIG. 6 where the creases define the points at which the material folds for the shade to collapse.

As the first and second materials are fed in opposite directions, they are fed along a first path in partially collapsed condition. As they near each other, they are progressively brought into and fed along a common second path. With the embodiment of the honeycomb structure shown in FIG. 6, the successive confronting and inwardly-directed creases 20 and 22 of the two pieces of material are brought into partially overlapping relationship as they are turned from their first path into the common second path and they are then directly attached together in this overlapping relationship. For this purpose, adhesive may be applied to one or both of the materials adjacent the creases 20 and 22. FIG. 6 shows schematically an adhesive applicator at 24 for applying a bead of adhesive 25 to one side of each of the creases 20. This adhesive may extend the full length of the crease or may be applied intermittently.

As the successive confronting creases 20, 22 are brought into overlapping relationship, they are supported by suitable backup structure 26 while a pressure member 27 moves down onto the overlapped creases to press them into adhering relationship. The backup structure 26 can be intermittently moved into and out of supporting relationship and can also be used to move the combined cell structure downwardly along the second common path after each set of creases is secured together. After the materials are joined together, they are collected in their common path. Throughout the process, formation of permanent creases in the front faces of the cells is avoided. Details of this process are found in Anderson U.S. Pat. No. 4,685,986.

The confronting, inwardly-directed creases 20, 22 aid in the folding of the two materials in accordion pleated fashion as the cells are moved to and from collapsed and expanded condition. The first material 18 has an additional set of outwardly-directed creases 21, in alternating relation with creases 20, which will also aid in the folding of the two materials and will give the shade a pleated appearance on one side. The other material does not have outwardly-directed creases, but rather is allowed to fold up in accordion-like fashion while providing a smoothly-curved drooping surface when the window covering is completed. Temporary creases or smooth folds may be formed at 23 to aid in the manufacturing process. The distance between creases 22 is greater than the distance between creases 20, in order that material 18 provides a rear wall of the shade which determines the maximum possible expansion of the shade. Material 19 therefore will provide the drooping appearance desired for the shade even in the fully expanded state.

Further, as seen from FIG. 6, the connecting of the adjacent cells together is effected while the two materials 18 and 19 are maintained in partially expanded condition. Thus, any bleeding of adhesive through the materials during the adhesive application or pressing operation will not cause any severe manufacturing problems. With the present invention, it is only desirable that the cells remain in their partially expanded condition until the adhesive is set, but the thickness of material in the area of attachment should prevent manufacturing difficulty.

With reference to FIG. 7 showing schematically the method of manufacture used in producing the honeycomb structures of FIG. 4, the two pieces of pleated material are fed along a first path, and as they are turned into a second common path, the creases 20, 22 are brought into laterally spaced relationship with each other. As each pair of associated creases attains this relationship, a piece of strip material 28 is brought into overlying relationship with the creased areas and joined thereto. For this purpose, suitable support means 26' and a cooperating pressure member 27' are used, similar in construction and operation to corresponding means shown in FIG. 6. Details of this method may be found in Anderson U.S. Pat. No. 4,685,986.

Figure 8:
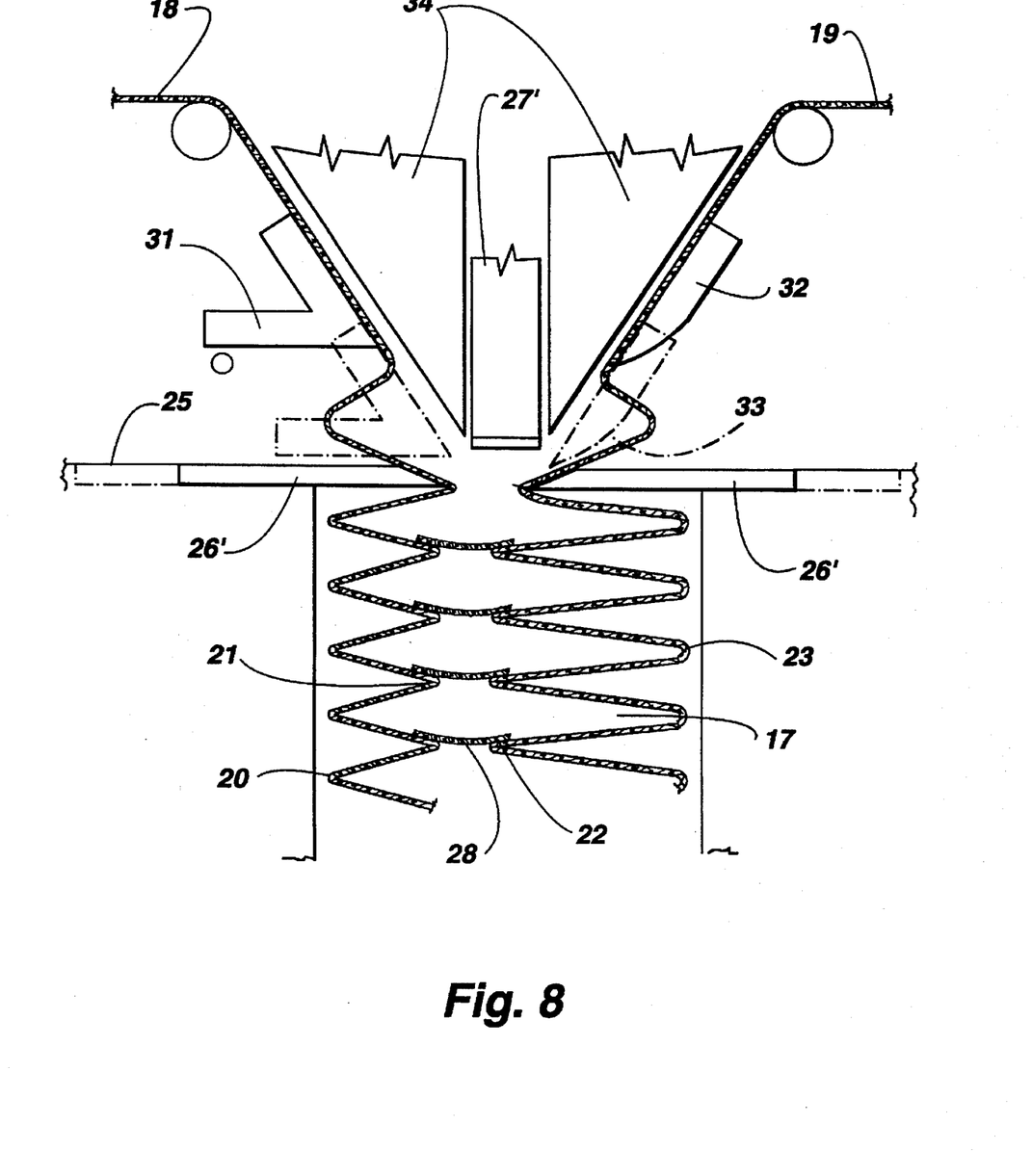
FIG. 8 is a schematic view showing a first alternative pleating and joining process according to the present invention.

An alternative manufacturing process, shown in FIG. 8, both pleats and joins the materials to form a shade similar to that shown in FIG. 7. The additional step of pleating materials 18 and 19 is carried out, respectively, by first reciprocating forming knife 31 and second reciprocating forming knife 32. Second forming knife 32 has a curved surface 33 on one side to avoid creasing material 19 on its surface over what will be the front faces of the cells. Support structures 34 provide the surface against which the forming knives press the materials during pleat formation. Surface 35 further assists the first forming knife 31 by providing a surface against which outside pleats 20 can be formed on material 18. The remainder of the process shown in FIG. 8 is substantially the same as shown in FIG. 7.

Figure 9:
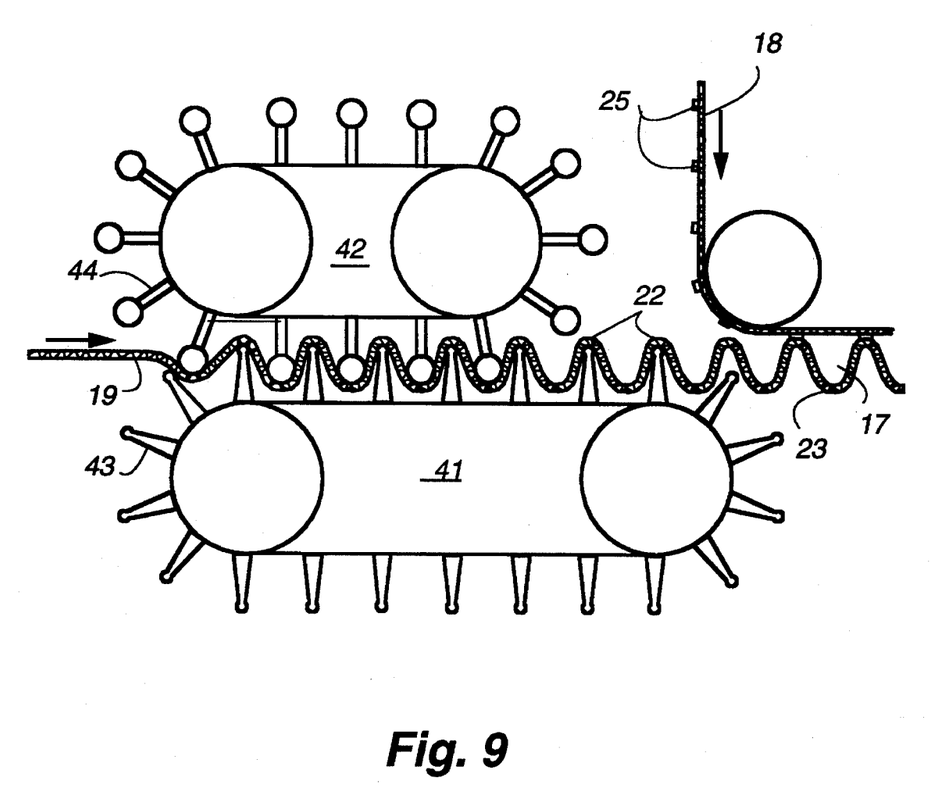
FIG. 9 is a schematic view showing a second alternative pleating and joining process according to the present invention.
Figures 10, 11:
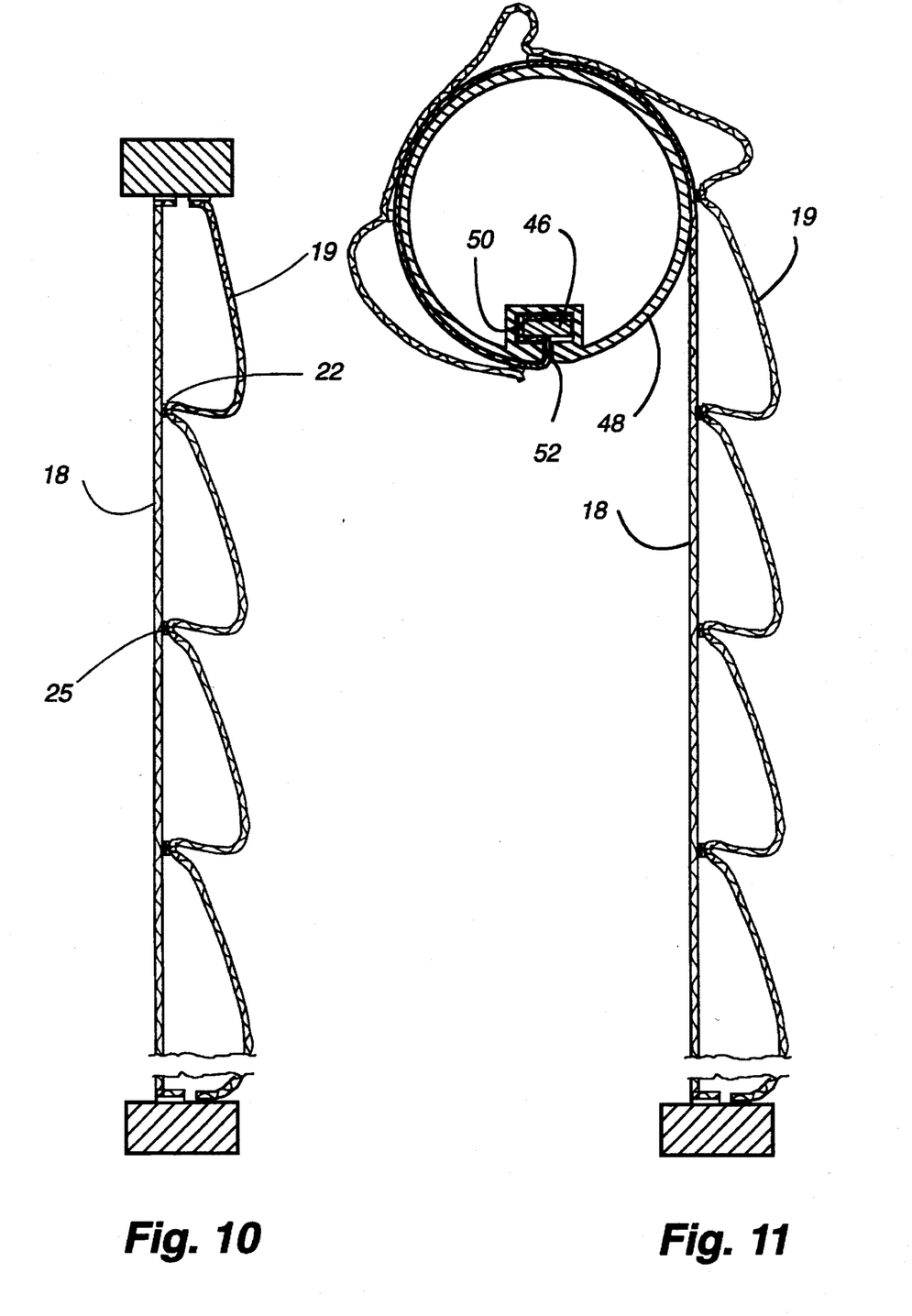
FIG. 10 is a cross-sectional view of the embodiment of the invention made in accordance with the process illustrated in FIG. 9.
FIG. 11 is a cross-sectional view of a Roman shade of the general type shown in FIG. 10 mounted on a roll bar.

Another alternative manufacturing process is shown in FIG. 9, which may be used to form the shade of the invention where only one set of pleats is formed on one sheet of material as shown in FIG. 10. As FIG. 9 shows, material 19 is fed between first forming conveyor 41 and second forming conveyor 42. First forming conveyor 41 has knife portions 43 which, in cooperation with support portions 44 of second forming conveyor 42, create creases 22 in material 19. Material 18 is provided uncreased, with a connector in the form of beads of adhesive 25 at intervals along its length. Material 19 is joined at creases 22 to material 18 by these beads of adhesive. The resulting shade structure will have no outwardly-pointing creases, and will have a smoothly drooping front wall portion in accordance with the teaching of the present invention.

While the embodiment of the invention shown in FIG. 10 is illustrated as having a headrail and a bottom rail so as to be retractable similarly to the embodiment shown in FIGS. 1 and 2, an alternative to that system of retraction is shown in FIG. 11. In FIG. 11, it will be seen that a cellular shade product of the type illustrated in FIG. 9 having an uncreased sheet 18 connected to a creased sheet 19 forms a plurality of vertically connected cells. In this embodiment the uncreased sheet 18 is extended upwardly for a short distance above the uppermost cell and has a thin metal strip 46 secured thereto along its uppermost edge. A roll bar 48, which can be conventionally mounted for selective rotation in either direction, is of tubular construction and can be extruded so as to provide a cylindrical outer surface about which the shade can be wrapped and an internal recess 50 formed in the outer surface for retention of the metal strip 46. In the disclosed embodiment, the recess 50 is rectangular in cross-section with access to the rectangular recess being through a relatively small neck 52. When connecting the cellular shade material to the roll bar, the metal strip along with the uppermost edge of the sheet 18 is slid longitudinally along the recess 50 such that the sheet 18 projects outwardly through the neck 52 in the roll bar. End caps can be positioned on opposite ends of the roll bar to prevent the metal strip and the suspended cellular shade material from being released from the roll bar. The cellular shade material can then be elevated by wrapping around the roll bar and extended by unwrapping the cellular shade material from the roll bar.

Although the present invention has been described with a certain degree of particularity, it is understood that the present disclosure has been made by way of example, and changes in detail or structure may be made without departing from the spirit of the invention as defined in the appended claims.

What is claimed is:

1. A cellular shade for covering an architectural opening comprising in combination a first sheet of planar, unpleated, flexible material having a width and a length, said first sheet defining a set of joint lines extending across the width thereof and spaced apart along the length thereof, a second sheet of flexible material having a width and a length, the width of said second sheet being substantially equal to the width of said first sheet, and the length of said second sheet being longer than the length of said first sheet, said second sheet having a set of joint lines extending across the width thereof and spaced apart along the length thereof, the spacing between said joint lines on said second sheet being substantially greater than the spacing between said joint lines on said first sheet, a connector fixedly joining said first sheet at said joint lines thereon to said second sheet at corresponding joint lines thereon to form a plurality of parallel cells extending across the width of said sheet, said first sheet defining a planar, unpleated rear wall of each of said cells and said second sheet defining the front wall of each of said cells, which said front wall forms a curved drooping surface projecting outwardly and away from the back wall of each cell, a roll bar about which the connected first and second sheets can be wrapped, and a connection system for operatively connecting the first and second sheets to said roll bar.

2. A cellular shade as defined in claim 1 wherein said joint lines on said second sheet of flexible material are creases.

3. A cellular shade as defined in claim 2 wherein said curved drooping surface has a lowermost edge and said lowermost edge is at least as low as the lowermost joint line corresponding to the associated cell.

4. The shade of claim 1 wherein said connection system includes elongated strip of somewhat rigid material secured to one of said sheets and a recess on said roll bar adapted to releasably retain said strip.

5. A cellular shade of claim 4 wherein said strip is connected to said first sheet.

\* \* \* \* \*

UNITED STATES PATENT AND TRADEMARK OFFICE
CERTIFICATE OF CORRECTION

PATENT NO. : 5,603,368
DATED : Feb. 18, 1997
INVENTOR(S) : Wendell B. Colson, et al.

It is certified that error appears in the above-indentified patent and that said Letters Patent is hereby corrected as shown below:

Col. 5, line 44          "portions ill the same manner" should be --portions in the same manner--

Signed and Sealed this

Fifth Day of August, 1997

Attest:

BRUCE LEHMAN

Attesting Officer        *Commissioner of Patents and Trademarks*